United States Patent [19]

Hang-Fu

[11] Patent Number: 5,386,802
[45] Date of Patent: Feb. 7, 1995

[54] ANIMAL EXCREMENT COLLECTOR

[76] Inventor: Lee Hang-Fu, 753 Firestone Dr., Avon Lake, Ohio 44012

[21] Appl. No.: 194,253

[22] Filed: Feb. 10, 1994

[51] Int. Cl.⁶ .............................................. A01K 23/00
[52] U.S. Cl. ...................................... 119/95; 604/342
[58] Field of Search .................... 119/95; 604/342, 345

[56] References Cited

U.S. PATENT DOCUMENTS

| | | | |
|---|---|---|---|
| 2,544,341 | 3/1951 | McGraw | 119/95 |
| 2,882,858 | 4/1959 | Dlugi | 119/95 |
| 3,043,306 | 7/1962 | Hergatt et al. | 604/342 |
| 3,656,459 | 4/1972 | Missud | 119/95 |
| 3,786,787 | 1/1974 | Weinberger | 119/95 |
| 4,095,562 | 6/1978 | Graham . | |
| 4,103,645 | 8/1978 | Tyler | 119/95 |
| 4,256,110 | 3/1981 | Scoville | 604/342 |
| 4,269,148 | 5/1981 | Holley-Donawa . | |
| 4,444,152 | 4/1984 | Berardo | 119/95 |
| 4,537,153 | 8/1985 | Vidal . | |
| 4,709,661 | 12/1987 | Mayle, Jr. | 119/95 |
| 4,779,573 | 10/1988 | Vidal . | |
| 4,893,587 | 1/1990 | Bailey, Jr. . | |
| 4,969,419 | 11/1990 | Fong | 119/95 |
| 5,146,874 | 9/1992 | Vidal . | |
| 5,269,774 | 12/1993 | Gray | 604/342 |

FOREIGN PATENT DOCUMENTS

| | | | |
|---|---|---|---|
| 2675660 | 10/1992 | France | 119/95 |
| 2238454 | 6/1991 | United Kingdom | 119/95 |

Primary Examiner—Paul J. Hirsch
Attorney, Agent, or Firm—Oldham, Oldham & Wilson Co.

[57] ABSTRACT

A device to be worn by a dog or other animal to accept and retain primarily feces. The device includes a contact member contoured to the general shape of the animal buttocks and designed to be secured adjacent to the buttocks of the animal. The contact member includes an aperture designed to circumscribe the anus of the animal. A disposable container is secured in the aperture by a retaining insert. The device may be secured adjacent to the animal by means such as straps which originate from a harness worn by the animal.

10 Claims, 3 Drawing Sheets

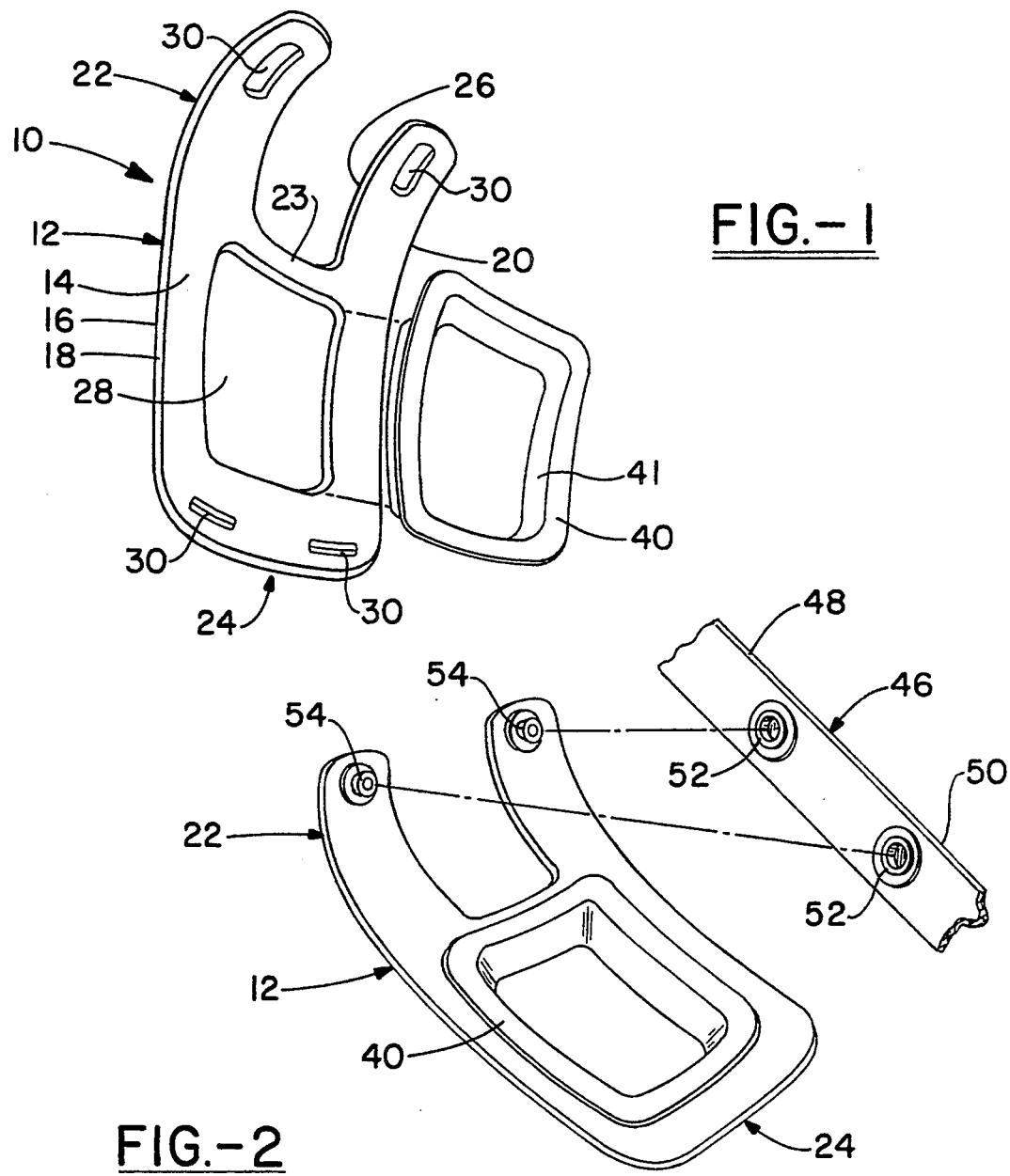

ANIMAL EXCREMENT COLLECTOR

FIELD OF INVENTION

The present invention relates generally to devices designed to be worn by animals, and more specifically to those devices designed to accept and retain animal excrement.

BACKGROUND OF THE INVENTION

In urban areas and suburban neighborhoods, there exists a problem of animal excrement littering the streets, parks, and yards. This animal excrement, particularly that from dogs, creates an unpleasant and unhealthy environment.

One solution has been for that person in charge of the animal to follow diligently behind the animal with a scoop or shovel and, when necessary, scoop or shovel the animal excrement from the pavement or grass. This solution is tiresome, marginally effective, and not at all pleasant for the person performing the scooping and others nearby. In addition, animal owners may inadvertently or intentionally fail to be diligent in performing their duties.

Also, it is not uncommon for a pet owner or caretaker or one in charge of animals in a laboratory setting to be in need of a sample of feces from a particular animal. Without a device to collect the feces, the person desiring a sample would be required to obtain the sample using a scoop or shovel and to place the sample in a bag or other suitable container. Furthermore, animal owners often find it necessary to leave animals at home unattended for long periods of time. This situation presents the constant threat of returning to find that the animal has defecated on a carpet or floor. In an attempt to prevent such a mishap, animal owners attempt to confine the animal to a portion of the home where such a mess is easily cleaned, or they attempt to train the animal to use a litter box. The former is not entirely humane or helpful, while the latter has drawbacks such as an unpleasant smell and a scattering of the litter material itself.

The following are examples of prior art animal excrement collectors:

Fong, U.S. Pat. No. 4,969,419 discloses an animal excrement collector consisting of a harness and a collection envelope wherein the collection envelope is designed to be attached to the harness and dangle behind the animal below the anal opening until the animal enters the normal defecating position at which time the movement of the animal's tail is utilized to open the mouth of the collection envelope and bring the opening into closer proximity with the anus of the animal.

U.S. Pat. Nos. 4,537,153, 4,779,573, and 5,146,874, all to Vidal, disclose garments designed to be worn by male or female animals to collect and retain feces and urine. The garments, as designed, have an aperture therein to encompass the general region of the buttocks, the tail, and the anus of the animal. The aperture leads to a pouch which is designed to collect and retain animal feces. The Vidal patents also disclose the use of a detachable and disposal collection pouch.

Berardo, U.S. Pat. No. 4,444,152 discloses a harness designed to be used in conjunction with a disposable plastic bag or other bag wherein the harness permits the bag to be secured near the general hind portion and buttocks of the animal wearing the device permitting the plastic bag to collect and retain the animal feces.

Holley-Donawa, U.S. Pat. No. 4,269,148 discloses a harness designed to be used in conjunction with a detachable bag. The harness, which is constructed out of various straps of material, secures a thin flexible ring adjacent to the buttocks of the animal. The opening of a collector bag is then secured between a pair of concentric frames and positioned adjacent the canine's anal opening.

Graham, U.S. Pat. No. 4,095,562 discloses a device to collect animal excrement which includes a jacket portion to be worn around the torso of an animal, and an animal excrement collector portion releasably attached to the jacket portion. The collector portion encompasses substantially all of the buttock region of the animal and also extends a sufficient distance under the animal to collect urine. Graham is worn essentially as a diaper for animals.

None of these prior devices teaches or suggests utilizing a curved member to conform to the general shape of the buttocks of an animal to provide a comfortable means for keeping the opening of the excrement collecting bag in close proximity to the anus of the animal to minimize spillage of feces. Due to the deficiencies and limitations of the prior art, applicant's invention is herein presented.

SUMMARY OF THE INVENTION

It is an object of the invention described herein to provide an effective solution to the problem of collecting animal excrement with minimal discomfort to the animal.

It is a further object of this invention to provide a convenient and effective means of collecting and disposing of animal feces.

It is a further object to provide means for quickly and easily attaching or detaching the device adjacent to the buttocks of the animal.

The invention utilizes a contact member made of substantially rigid material where the member is curved in a manner so that it conforms to the general contour of the buttocks of the animal wearing the device. The curved contact member has an aperture therein of sufficient size and in a suitable location so that the aperture circumscribes at least the anus of the animal when the curved contact member is secured adjacent to the buttocks of the animal. In the preferred embodiment, the curved contact member has a notch cut above the aperture designed to accommodate the root of the tail of the dog or other animal when the curved member is secured adjacent to the buttocks of the animal. The notch also helps to prevent rotational movement of the curved contact member.

The invention also utilizes a means for collecting and retaining animal feces which, in the preferred embodiment, is a flexible, disposable container such as a plastic bag. The preferred embodiment utilizes a detachable retaining insert to secure the opening of the bag in the aperture.

A variety of methods may be employed to secure the curved contact member adjacent to the buttocks and anus of the animal. In the preferred embodiment, the curved contact member is intended to be used in conjunction with a harness worn by the animal. The harness may be of many different designs.

The present invention provides a novel and effective solution to the problems discussed above by utilizing a curved or contoured contact member. The curvature allows the contact member to remain in close proximity to the buttocks of the animal so that feces will be able to pass through the aperture in the curved member with less chance of leakage. The curvature also provides a higher level of comfort to the animal as compared to a straight member or a thin ring type member. The use of disposable bags to collect the feces in conjunction with a retaining ring or insert provides a quick and easy solution to the collection and disposal of animal feces. The use of a harness to secure the device adjacent to the buttocks of the animal provides a simple and effective means of using the device.

BRIEF DESCRIPTION OF THE DRAWINGS

For a better understanding of the invention, reference should be had to the accompanying drawings, wherein:

FIG. 1 is an exploded perspective view of contact member and the detachable retaining insert.

FIG. 2 is a perspective view of contact member having the retaining insert secured in the aperture.

DETAILED DESCRIPTION OF THE INVENTION

Figure 3:
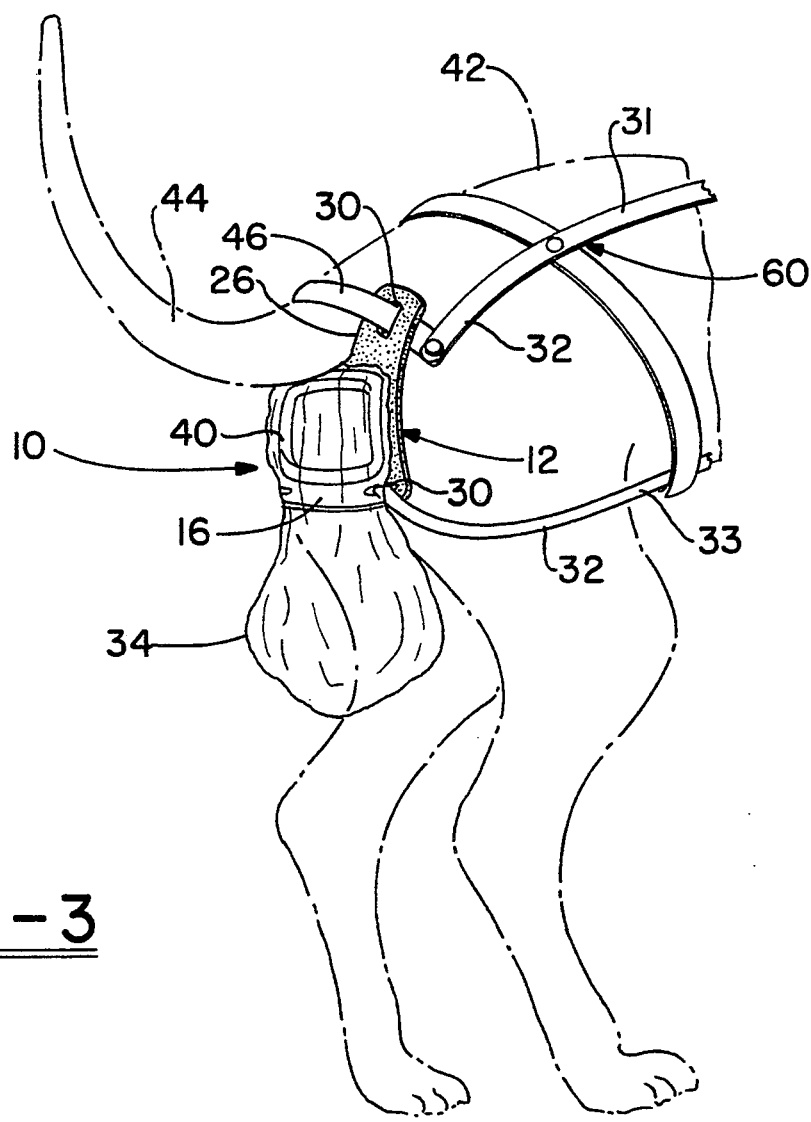
FIG. 3 is a perspective view showing the device secured adjacent to the buttocks of a dog using a harness.

FIG.1 shows a preferred embodiment of the invention, generally 10, which comprises a curved contact member 12 made from a sheet or plate of substantially rigid material, which will not absorb moisture or become easily soiled, preferably a plastic such as acrylic. The curvature of contact member 12 is formed by means known in the art. Contact member 12 should be of a sufficient thickness so as to maintain its shape and is designed to be durable and withstand repeated use. However, the curved contact member 12 must not be so thick as to become too heavy and burdensome for the animal wearing it. It is believed that a thickness of approximately $\frac{1}{8}''$ to $\frac{1}{4}''$ is preferable, although the invention is not limited to such a thickness. The contact member 12 is defined by an inner (or first) surface 14 and an outer (or second) surface 16, a first side edge 18 and a second side edge 20, and an upper region 22 and a lower region 24. The contact member 12 is curved so that the inner surface 14 is substantially concave. This is accomplished primarily by curving the upper region 22 and the lower region 24 relative to each other. If desired to better follow the contour of the animal's buttocks, the first edge 18 and the second edge 20 may be curved inward relative to one another.

Contact member 12 is shown as having a generally rectangular shape although other shapes which accomplish the purposes and objectives of the invention are contemplated. The upper region 22 of contact member 12, in the preferred embodiment has a notch 26 cut therein designed to accommodate the root of the tail of the animal wearing the device. Contact member 12 has an aperture 28 located substantially in the center, just below the notch 26 designed to circumscribe at least the anus of the animal wearing the device.

In the preferred embodiment, the perimeter of contact member 12 has a plurality of attachment holes 30 designed to permit attachment to trailing straps 32 (as seen in FIG. 3) which are in turn attached to a harness means 60 such that contact member 12 is secured adjacent to the buttocks of the animal wearing the device. The attachment holes 30 may vary in number and be formed in any portion of the perimeter of contact member 12 but it is thought that placement as shown in FIG. 1 is preferable for providing a close fit and for preventing rotational movement of contact member 12 relative to the buttocks of the animal.

As an alternative to the attachment holes 30, a plurality of conventional snap mechanisms, buckles or other fasteners as are known in the art, such as hook and loop type engaging elements, may be disposed on the curved member 12 or straps 32 as appropriate to secure the device.

Figure 4:
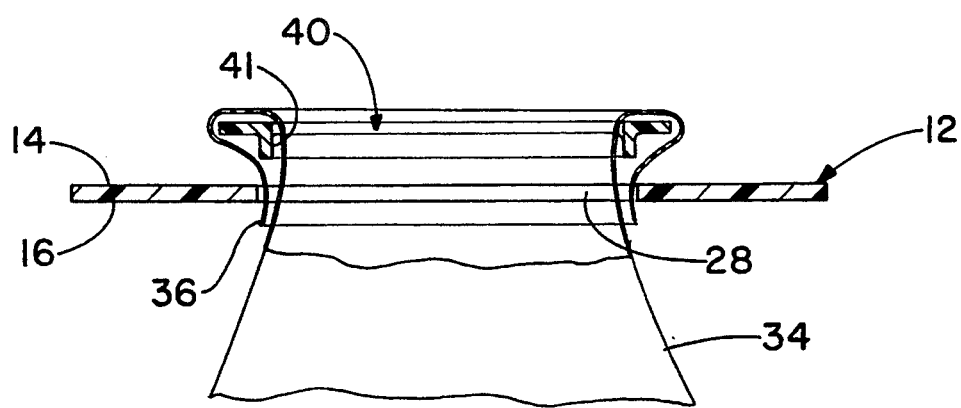
FIGS. 4 and 5 are cross-sectional views of alternative embodiments of the attachment between the contact member, the detachable retaining insert, and the flexible bag.
Figure 5:
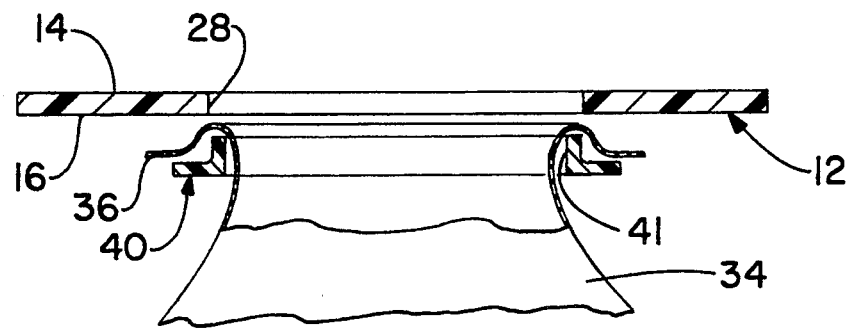

FIGS. 4 and 5 show a flexible bag 34 which has an open end 36 designed to be secured in the aperture 28 of the contact member 12 by the retaining insert 40. The retaining insert 40 is of the same shape as the aperture 28 although of slightly smaller dimensions so that the insert 40 can be inserted into the aperture 28 and be frictionally retained therein with a snap fit. Preferably, although not required, the insert 40 is made from the same material as contact member 12. A variety of methods of securing the opening of the bag 36 in the aperture 28 of the contact member 12 will be readily apparent to those skilled in the art.

FIG. 4 shows a preferred embodiment which is designed to prevent the retaining insert 40 from becoming soiled. Bag 34 is placed in position so that its open end 36 passes through aperture 41 in retaining insert 40 and aperture 28 of the contact member 12. Bag's 36 closed end 35 extends outward and downward from the outer surface 16 (away from the animal) of the contact member 12. Open end 36 is then wrapped around the outer circumference of retaining insert 40 and threaded back through the aperture 28 in the contact member 12. Retaining insert 40 is then snapped into the aperture 28 against the inner surface 14 of the contact member 12 thereby frictionally securing the opening of the bag 36 in the aperture 28 of the contact member 12.

As shown in FIG. 5 it is also contemplated to wrap the opening of the flexible bag 36 around the retaining insert 40 and snap the retaining insert 40 into the aperture 28 from the outer surface 16 of contact member 12 so that the flexible bag may be attached or detached without removal of contact member 12 from animal. Additional securing means, as are known in the art are contemplated, if needed, to keep retaining means in contact with contact member 12.

FIG. 3 shows an embodiment of the :invention 10 being worn by a dog 42. The first side (or inner surface) 14 of contact member 12 is secured adjacent to the buttocks of the dog 42 by a plurality of trailing straps 32 which originate from a harness 60 worn by the dog 42. Any variety of arrangements of straps may be employed to secure the first side 14 of contact member 12 adjacent to the buttocks of the dog 42 and the method shown is not designed to limit the invention to any particular strap or harness arrangement. The preferred embodiment has two trailing straps 31 traveling along opposite sides of the back of the dog 42, and two trailing straps 33 traveling along opposite sides, either under the belly and between the hind legs of the dog 42 or externally of the hind legs. The straps 32 in the preferred embodiment are threaded through the attachment holes 30 in the curved member 12 and then buckled back upon themselves, or otherwise fastened back upon themselves or fastened to the contact member 12 using means known in the art permitting the contact member 12 to be secured adjacent to the buttocks of the dog 42.

The flexible bag 34 extends rearward and downward from the second side 16 of the contact member 12. The root of the dog's tail 44 is contained in notch 26 so that the tail does not interfere with the placement of the curved member 12. The notch 26 also helps to eliminate rotational movement of the curved member 12 relative to the buttocks of the dog 42. A transverse strap 46 traveling across the notch 26 is used in the preferred embodiment to provide additional stability to the contact member 12 while it is fastened adjacent to the buttocks of the dog 42.

FIG. 2 shows an embodiment of the transverse strap 46 having a first end 48 and a second end 50, wherein the first and second sides of contact member's upper region 22 are secured to the traverse strap 46 using conventional snaps.

Figure 6:
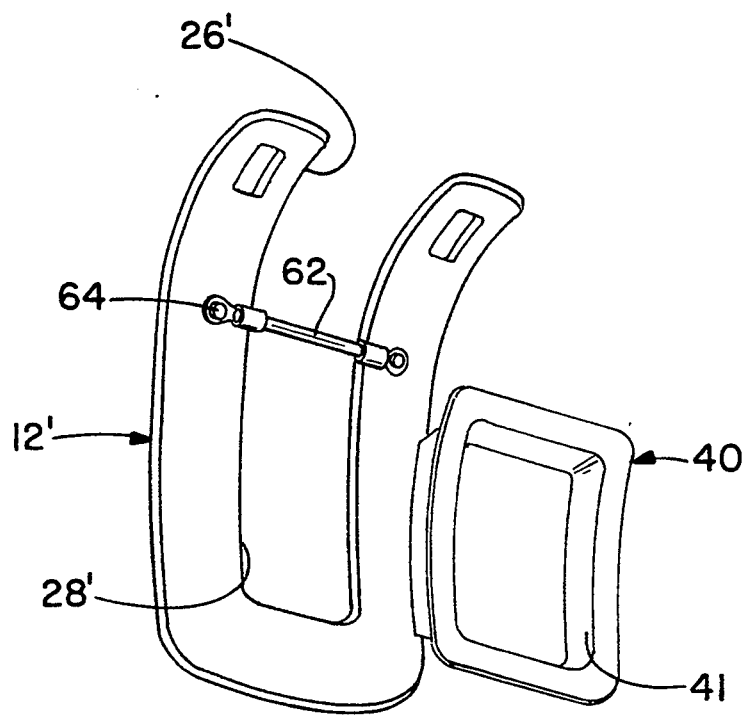
FIG. 6 is a perspective view of an alternative embodiment of the curved contact member and detachable retaining insert of the present invention.

FIG. 6 illustrates another embodiment of the present invention. Contact member 12' resembles contact member 12 shown in FIGS. 1-5. However, contact member 12' eliminates the cross member 23 which separates aperture 28 and notch 26 in contact member 12. Retaining insert 40 frictionally snaps into engagement with three sides of notch 26' due to the rigidity and resilience of contact member 12'. Optionally, an elastic member 62 traverses notch 26' and is fastened to contact member 12' on opposite sides of notch 26'. Elastic member 62 is tensioned to the shape of contact member 12' and aids in maintaining frictional engagement with retaining insert 40. The elimination of cross member 23 is thought to increase the comfort to the dog during use.

It is once again noted that the strap configurations shown herein are purely illustrative and any variety of strap configurations using any number of fastening means known in the art may be employed to secure contact member 12 adjacent to the buttocks and anus of the animal wearing the device.

While in accordance with the patent statutes the best mode and preferred embodiment of the invention have been described, it is to be understood that the invention is not limited thereto, but rather is to be measured by the scope and spirit of the claims.

I claim:

1. A device for accepting and retaining primarily animal feces wherein said device is designed to be worn by a dog or other animal having a torso, a tail, buttocks, and an anus, wherein said device comprises:
    (a) a substantially rigid curved contact member being designed to conform to at least the general shape of said buttocks, said member having a first surface designed to fit adjacent to said buttocks of said animal., a second surface, a periphery, an upper portion, a lower portion, an aperture therein, and a notch formed in said upper portion of said curved contact member and open to said periphery, and being of sufficient dimensions to encompass a substantial portion of said tail when said curved member is secured adjacent to said buttocks of said animal;
    (b) harness means for retaining said curved contact member adjacent to said buttocks of said animal so that said aperture essentially circumscribes at least the anus of said animal;
    (c) attachment means for attaching said curved contact member to said harness means;
    (d) container means for collecting animal feces comprising a body portion, and an opening in said body portion;
    (e) a retaining insert shaped to correspond to said aperture, said retaining insert capable of frictionally securing said container means to said curved contact member, such that said opening in said container means is essentially concentric with and secured adjacent to said aperture in said curved member, and said body portion of said container means extends outward from said second surface of said curved contact member.

2. A device as recited in claim 1, further comprising a transverse strap traveling across the open portion of said notch.

3. A device as recited in claim 1, wherein said attachment means comprises a plurality of attachment holes formed in said periphery of said curved member permitting said at least one strap of said harness means to be threaded therethrough.

4. A device as recited in claim 1, wherein said attachment means comprises at least one snap mechanism disposed on said periphery of said curved member, and said at least one strap of said harness means includes at least one corresponding coacting snap mechanism disposed thereon.

5. A device as recited in claim 1 wherein said container means comprises a flexible bag.

6. A device for accepting and retaining primarily animal feces wherein said device is designed to be worn by a dog or other animal having a torso, a tail, buttocks, and an anus, wherein said device comprises:
    a substantially rigid curved contact member designed to conform to at least the general shape of said buttocks, said member having a first surface designed to fit adjacent to said buttocks of said animal, a second surface, a periphery, an upper portion, a lower portion, and a notch formed in said curved contact member and open to said periphery, and being of sufficient dimensions to encompass said anus and at least a portion of said tail;
    harness means for retaining said curved contact member adjacent to said buttocks of said animal so that said notch encompasses at least the anus of said animal;
    attachment means for attaching said curved contact member to said harness means;
    container means for collecting animal feces comprising a body portion and an opening in said body portion;
    a retaining insert capable of frictionally securing said opening of said container means in said notch when said retaining insert is inserted into said notch such that said opening in said container means is adjacent to said notch, and said body portion of said container extends outward from said second surface of said curved contact member.

7. A device as recited in claim 6, further comprising at least one elastic member which traverses said notch.

8. A device as recited in claim 6, wherein said attachment means comprises a plurality of attachment holes formed in said periphery of said curved member permitting said at least one strap of said harness means to be threaded therethrough.

9. A device as recited in claim 6, wherein said attachment means comprises at least one snap mechanism disposed on said periphery of said curved member, and said at least one strap of said harness means includes at least one corresponding coacting snap mechanism disposed thereon.

10. A device as recited in claim 6, wherein said container means comprises a flexible bag.

* * * * *